United States Patent [19]

Shiozaki et al.

[11] 4,329,323
[45] May 11, 1982

[54] PROCESS FOR REMOVING ETHYLENE AND VINYL CHLORIDE FROM GAS STREAM

[75] Inventors: Ken Shiozaki, Hyogo; Hironobu Ibaraki, Akashi, both of Japan

[73] Assignee: Kanegafuchi Kagaku Kogyo Kabushiki Kaisha, Osaka, Japan

[21] Appl. No.: 199,301

[22] Filed: Oct. 21, 1980

[30] Foreign Application Priority Data

Oct. 31, 1979 [JP] Japan .................................. 54/141616

[51] Int. Cl.³ .............................................. B01D 53/36
[52] U.S. Cl. ..................................... 423/240; 423/488;
570/243; 570/245; 570/247; 570/251; 570/254; 570/255
[58] Field of Search ................ 423/240 R, 240 S, 488;
570/243, 245, 247, 251, 254, 255

[56] References Cited

U.S. PATENT DOCUMENTS 3,190,931 6/1965 Lainé et al. .......................... 570/243
3,892,816 7/1975 Kister .................................. 570/245
4,029,714 6/1977 Ziegenhagen et al. ............. 570/247

Primary Examiner—Earl C. Thomas
Attorney, Agent, or Firm—Armstrong, Nikaido, Marmelstein & Kubovcik

[57] ABSTRACT

A process for removing ethylene and vinyl chloride from a gas stream containing them by passing a mixed gas containing ethylene, vinyl chloride and a necessary amount of chlorine through a fixed-bed reactor charged with as a catalyst an activated alumina supporting at least 4% by weight of ferric chloride in terms of iron, said catalyst having an outer surface area per unit packed catalyst volume of not less than 7.8 cm.²/ml. Ethylene and vinyl chloride are converted into and removed as 1,2-dichloroethane and 1,1,2-trichloroethane. The concentrations of ethylene and vinyl chloride can be decreased to not more than 10 p.p.m. and not more than 20 p.p.m., respectively.

5 Claims, 1 Drawing Figure

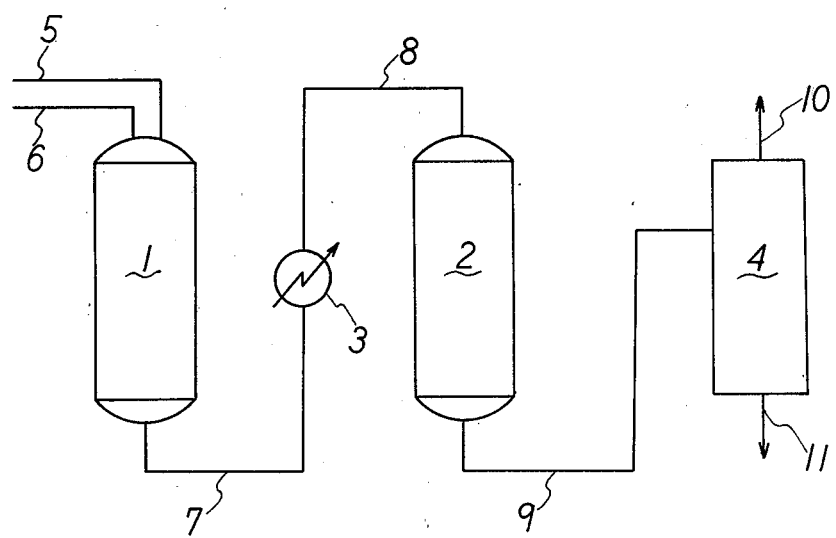

PROCESS FOR REMOVING ETHYLENE AND VINYL CHLORIDE FROM GAS STREAM

BACKGROUND OF THE INVENTION

The present invention relates to a process for removing simultaneously ethylene and vinyl chloride from a gas containing them.

In many processes for chlorination or oxychlorination of ethylene, the conversion of ethylene is not substantially complete. In particular, an effluent from a conventionally used oxychlorination reactor usually contains 0.1% to 10% by volume of the unreacted ethylene together with hydrogen chloride gas, oxygen and an inert gas in addition to the reaction product even after separation of the condensate by cooling for liquefaction. In addition to the unreacted ethylene, 50 to 500 p.p.m. of vinyl chloride is usually further contained in the effluent gas. From view point of prevention of environmental pollution, it has been lately desired to make the concentrations of ethylene and vinyl chloride in such waste gases as low as possible.

With respect to ethylene, there has hitherto been proposed an ethylene recovery system for recovering the large portion of the residual ethylene, as disclosed in Japanese Patent Examined Publication (Tokkyo Kokoku) No. 43921/1974 and Japanese Patent Unexamined Publication (Tokkyo Kokai) Nos. 57105/1977 and 59105/1977.

Japanese Patent Examined Publication No. 43921/1974 discloses a process in which an ethylene purification reactor is installed at the outlet of an oxychlorination system for ethylene and the unreacted ethylene in the oxychlorination effluent gas is reacted with chlorine in the presence of activated alumina as a catalyst to produce 1,2-dichloroethane. However, in Japanese Patent Unexamined Publication No. 59105/1977, it is pointed out that according to the above-mentioned process at least several thousands p.p.m. of ethylene still remains, and as a process for remarkably decreasing the residual proportion of ethylene, there is proposed a process in which a reactor charged with a mixed catalyst of metal iron and activated alumina impregnated with ferric chloride is further installed to decrease the ethylene concentration to less than 50 p.p.m. However, in that case, a relatively long contact time is required in catalytic reaction, and accordingly the reactor must be made large-sized and a heavy equipment investment is required. Also, metal iron may rapidly react with chlorine, and the resulting ferric chloride may transpire from the reactor or cause troubles such as choking of the reactor. Also, the removal of vinyl chloride is not intended and no description as to vinyl chloride is seen in Japanese Patent Unexamined Publication No. 59105/1977. In fact, according to the study of the present inventors, this process cannot sufficiently remove vinyl chloride, and it was also observed that under a certain reaction condition vinyl chloride is produced by catalytic decomposition of 1,2-dichloroethane contained in the gas stream, resulting in the increase of the content of vinyl chloride in contrast with the removal.

Some process for removing vinyl chloride included in a gas are proposed. One of them is an adsorption process using active carbon, but the process has problems that it is hard to decrease the concentration of vinyl chloride in a gas to less than about 20 p.p.m. and that the escape of vinyl chloride to the atmosphere cannot be prevented in a steam reproducing cycle and upon disposal of active carbon. Particularly, in case that a gas contains a chlorinated hydrocarbon other than vinyl chloride like a waste gas from a vinyl chloride manufacturing process, the adsorption process is economically disadvantageous, since the adsorption capacity for vinyl chloride is remarkably lowered.

As another process for removing vinyl chloride from an inert gas stream, there is known a process in which the gas stream is subjected to combustion to decompose vinyl chloride to carbon dioxide, water and hydrogen chloride and the exhausted gas is then washed with a caustic alkali to remove hydrogen chloride. However, not only this process is economically disadvantageous due to large apparatus and fuel costs, but also the combustion waste gas pollutes the air.

There is proposed the improvement of the process of Japanese Patent Examined Publication No. 43921/1974, in which the conversion of ethylene can be increased and simultaneously the selectivity to 1,2-dichloroethane can be remarkably increased by the use of activated alumina supporting cupric chloride and/or ferric chloride as a catalyst, as disclosed in Japanese Patent Unexamined Publication No. 57105/1977 in which one of the present inventors is concerned. It is known that ferric chloride catalyzes the chlorination mechanism. However, even if ferric chloride is supported on porous carriers having a particle size of about 5 to about 6 mm. which are usually known as carriers for catalysts used in fixed-bed reactions, it slightly accelerates the chlorine-addition reaction of vinyl chloride. Therefore, it has been difficult to decrease vinyl chloride to 20 p.p.m. or less concentration and moreover to maintain the catalytic activity in the initial stage of the use over a long time.

SUMMARY OF THE INVENTION

The present inventors have now found that the activity and the life of the ferric chloride-supporting catalyst greatly depend on the amount of ferric chloride supported and characteristics of a carrier for supporting ferric chloride, and on the basis of the improvement of the ferric chloride-supporting catalyst, have found that ethylene and vinyl chloride included in a gas can be simultaneously removed by reacting them with chlorine.

In accordance with the present invention, there is provided a process for removing ethylene and vinyl chloride from a gas stream which comprises passing a mixed gas containing ethylene, vinyl chloride and a necessary amount of chlorine through a fixed-bed reactor charged with as a catalyst an activated alumina supporting at least 4% by weight of ferric chloride in terms of iron, said catalyst having an outer surface area per unit packed catalyst volume of not less than 7.8 cm.$^2$/ml.

The improved catalyst employed in the process of the present invention has a high activity and can maintain its activity over a long time, and has a strong activity to the chlorine-addition reaction of not only ethylene, but also vinyl chloride. Therefore, according to the process of the present invention, vinyl chloride can be removed and recovered as 1,1,2-trichloroethane simultaneously with the removal and recovery of ethylene as 1,2-dichloroethane, and the concentrations of ethylene and vinyl chloride in a gas can be decreased to not more than 10 p.p.m. and not more than 20 p.p.m., respectively.

BRIEF DESCRIPTION OF THE DRAWING

The accompanying drawing is a flow diagram showing an embodiment of the process of the present invention.

DETAILED DESCRIPTION

The amount of ferric chloride supported on a carrier and the characteristics of the carrier material have a great influence on the activity and life of the catalyst. Preferable carrier is an activated alumina having a specific surface area of at least 100 m.$^2$/g., preferably at least 150 m.$^2$/g. It has also been found that the reactions of ethylene and vinyl chloride with chlorine take place very near the outer surface of the catalyst, and the activity of the catalyst is proportioned to the outer surface area of the catalyst per unit volume of the catalyst. That is to say, the smaller the particle size of the catalyst, the better result is obtained. Although the catalyst used in the process of the present invention is not limited to a specific shape and may be used in any forms such as spherical, crushed, ring and haneycomb shapes, it is essential that the outer surface area of the catalyst per unit packed catalyst volume is at least 7.8 cm.$^2$/ml. In case of the spherical catalyst, it is desirable that the diameter of the catalyst is at most 4.5 mm., especially at most 4 mm., and the diameter within the range of 2 to 4 mm. is particularly preferred in consideration of pressure drop. In case that the catalyst is not spherical, it is desirable that the equivalent diameter of the catalyst is at most 4.5 mm., especially at most 4 mm., and more especially from 2 to 4 mm. From viewpoint of the catalytic activity, there is preferred the activated alumina carrier such that the volume of the pores having a semidiameter of at least 100 angstroms is at least 20% of the volume of whole pores.

The ferric chloride is supported on the carrier in an amount of not less than 4% by weight, preferably 5 to 12 by weight, in terms of iron based on the weight of the carrier, from viewpoint of the activity and life of the catalyst. The support of ferric chloride on the carrier is conducted in a usual manner.

Even in the case where mere activated alumina or a ferric chloride-supporting activated alumina having a particle size of more than 4.5 mm. is used as a catalyst, there may be a possibility that the similar result to that in the present invention is obtained when the reaction is conducted in a very long catalyst bed. However, according to the process of the present invention, the desired good result can be obtained by the reaction in a relatively short catalyst bed, and this is one of the features of the present invention.

A gas containing ethylene, vinyl chloride and chlorine is passed through the fixed-bed reactor charged with the catalyst. It is necessary that the gas to be passed through the reactor contains a necessary amount of chlorine for reaction with ethylene and vinyl chloride included in the gas, that is, for converting ethylene and vinyl chloride to 1,2-dichloroethane and 1,1,2-trichloroethane respectively. Chlorine is usually supplied so that the concentration of the unreacted chlorine in the treated gas is at most 500 p.p.m, especially 50 to 500 p.p.m. The excess percent of the supplied chlorine is usually selected from 1% to 15% by mole based on the total amount of ethylene and vinyl chloride. The mixed gas containing ethylene, vinyl chloride and chlorine may be repeatedly passed through the fixed-bed reactor charged with the catalyst, or a gas to be treated may be pretreated by feeding a necessary amount of chlorine to the gas and passing through a known catalyst, e.g. cupric chloride and/or ferric chloride supported on activated alumina to decrease the concentrations of ethylene and vinyl chloride. The pretreatment is advantageous when the concentrations of ethylene and vinyl chloride in a gas are high, and for instance, ethylene and vinyl chloride contained in the gas in a total concentration of about 1% to about 10% by volume are decreased to about 1% by volume or less in total concentration. The thus pretreated gas containing ethylene, vinyl chloride and chlorine is then passed through the improved catalyst of the present invention. According to the process of the present invention, the concentration of ethylene in a gas can be decreased to not more than 10 p.p.m., and the concentration of vinyl chloride can be decreased to not more than 20 p.p.m.

The process of the present invention is particularly suited for removal of ethylene and vinyl chloride from a gas stream discharged from an oxychlorination process of ethylene, and the ethylene and vinyl chloride included in the waste gas can be effectively and economically removed. Of course, the process of the invention is applicable to any gases containing ethylene and/or vinyl chloride in order to remove or decrease them, regardless of the source of the gases.

It is desirable that the total concentration of ethylene and vinyl chloride in a gas to be treated is less than about 1% by volume, and for instance, a gas containing less than about 1% by volume, especially 1,000 to 10,000 p.p.m., of ethylene and vinyl chloride in total is treated by the process of the present invention. When the total concentration of ethylene and vinyl chloride in a gas to be treated is from about 1% to about 10% by volume, the gas is preferably pretreated to decrease the total concentration to about 1% by volume or less. The pretreatment is usually carried out by passing the gas to which chlorine is fed, through a reactor (hereinafter referred to as "first reactor") charged with a known catalyst, e.g. cupric chloride and/or ferric chloride supported on activated alumina, preferably a mixture of cupric chloride and/or ferric chloride supported on activated alumina having an equivalent diameter of 5 to 7 mm. as a catalyst and a nonactivated diluent. The pretreated gas is then passed through a reactor (hereinafter referred to as "second reactor") charged with the improved catalyst of the present invention.

Any of heat exchanger type reactors and tank-shaped adiabatic type reactors may be employed as the second reactor. In case that the total concentration of ethylene and vinyl chloride in the gas at the inlet of the second reactor is less than about 1% by volume, the rise of the temperature of the gas stream by reaction heat is small, and the use of the tank-shaped adiabatic type reactor is economical. Also, by the use of a reactor of such a shape, it becomes easy to maintain the pressure drop due to the reactor within the range such that no problem occurs in practical use. Further, in addition that the gas phase chlorination reaction in the second reactor can be economically made by the use of the particular catalyst of the invention, it is also possible to obtain the desired result by using the latter half portion of the first reactor or a tank-shaped adiabatic type reactor built into the first reactor as a second reactor. This is particularly advantageous in applying the present invention to the existing plants.

In the process of the present invention, the temperature of the gas in the catalyst bed is selected from about 80° to about 200° C., preferably 100° to 180° C. The reaction pressure is selected from 0.1 to 20 atm. Especially, the reaction pressure is selected from 0.1 to 10 kg./cm.$^2$G, preferably 1 to 5 kg./cm.$^2$G. The space velocity of the gas stream is selected from about 100 to about 5,000 hr.$^{-1}$, preferably 200 to 3,000 hr.$^{-1}$ Chlorine is fed to a gas to be treated. In case of pretreating the gas, it is desirable that the excess percent of the fed chlorine at the inlet of the first reactor is maintained usually 1% to 15% by mole based on the total amount of ethylene and vinyl chloride. The higher the excess percent of chlorine, the easier the removal of ethylene and vinyl chloride. However, from viewpoints of reduction of chlorine loss and post-treatment of the treated gas, it is desirable to control the excess percent of chlorine so that the concentration of the unreacted chlorine in the effluent gas from the second reactor falls within the range of 50 to 500 p.p.m. Also, a part of chlorine to be fed to the first reactor may be separately fed to the inlet of the second reactor.

After the conversion of ethylene and vinyl chloride to remove them, the effluent gas from the second reactor is post-treated. For instance, after removing organic compounds such as 1,2-dichloroethane and 1,1,2-trichloroethane by low-temperature processing, the gas containing chlorine and a slight amount of the by-produced hydrogen chloride is sent to a washing step and is discharged.

The present invention is more particularly described and explained by means of the following Examples, in which all % are by volume unless otherwise noted. These Examples are intended to illustrate the invention and are not to be construed to limit the scope of the invention.

In the following Examples, the experiments were conducted by employing an apparatus shown in the accompanying drawing. A reactor 1 is a first reactor for pretreatment, and a reactor 2 is a second reactor to be charged with the particular catalyst according to the present invention. The reactors 1 and 2 are reactors made of nickel pipe of 1 m. in length and 2 inches (about 51 mm.) in diameter and having a steel jacket of 4 inches (about 102 mm.) in inner diameter. In the reactor 1, the reaction heat is removed by sending a hot water of about 90° C. into the jacket to maintain the temperature of the catalyst bed at a prescribed temperature. In the reactor 2, the temperature of the catalyst bed is adjusted by sending a low-pressure steam of about 3 kg./cm.$^2$G in pressure into the jacket. The rise of the temperature due to the reaction heat in the reactor 2 is small, and accordingly the reactor 2 can be regarded substantially as an adiabatic type reactor. A small nickel tube of about 6 mm. in outer diameter for measuring the reaction temperature which extends in the longitudinal direction is provided at central portion of the reaction pipe in each of the reactors 1 and 2, and the temperature profile is measured by a movable thermocouple. The catalyst bed of the reactor 1 is divided to three layers, each of which has a length of 30 cm. and is charged with a catalyst of different kind or a catalyst having a different dilution rate.

A gas to be treated is fed through a pipe 5 and chlorine is fed through a pipe 6. Reference numeral 3 is a heat exchanger which is provided between pipes 7 and 8 for connecting the reactors 1 and 2. Reference numeral 4 is a separator where 1,2-dichloroethane, etc. are separated and the gas is sent to a washing step through a pipe 10. Impurities such as the separated 1,2-dichloroethane and 1,1,2-trichloroethane are drawn through a pipe 11.

In the following Examples, a gas fed through the pipe 5 to the reactor 1 consists of 4% of ethylene, 250 p.p.m. of vinyl chloride, 3% of oxygen, 4% of 1,2-dichloroethane, 1% of water and the residue of mainly nitrogen. The inlet pressure of the reactor 1 is maintained at 3.0 kg./cm.$^2$G. The space velocity of the gas stream in the reactors 1 and 2 is about 2,000 hr.$^{-1}$ under a normal condition.

In order to determine chlorine and hydrogen chloride in the effluent gas from the reactor 2, a part of the gas in the pipe 9 is taken out and is passed through a gas absorption bottle containing a prescribed amount of an aqueous solution of potassium iodide, and the absorbed chlorine and hydrogen chloride are determined at regular intervals by standard solutions of sodium thiosulfate and sodium hydroxide. Also, the concentrations of ethylene and vinyl chloride (hereinafter referred to as "VC") in the effluent gas from the reactor 2 are determined by taking out a part of the effluent gas, cooling it to about −25° C. to condense and separate 1,2-dichloroethane, and analyzing both of the resulting liquid phase and gas phase by means of gas chromatography.

In the following Examples excepting Example 5, spherical activated alumina (commercial name "HSC-114" made by HOUDRY PROCESS AND CHEMICAL CO.) having a particle size of ¼ inch (about 6.4 mm.) onto which 20% by weight of cupric chloride is supported, is employed as a catalyst for the reactor 1. The specific surface area (BET) of the employed activated alumina is 250 m.$^2$/g., and the packing density is 640 g./liter. A spherical fused alumina having a diameter of 6 to 7 mm. is employed as a diluent for the catalyst, and the above catalyst is packed in the first layer of the catalyst bed in a concentration of 20% and in the second layer in a concentration of 40%. The third layer is packed with only the catalyst.

EXAMPLES 1 to 3

On each of three kinds of activated alumina particles (commercial name "ACBM-1" made by Shokubai Kasei Kabushiki Kaisha) having different diameters and the following properties was supported ferric chloride in an amount of 7% by weight in terms of iron, and the reaction was carried out in the reactor 2 packed with each of the obtained catalysts.

Average particle size (mm.): 2.5, 3.3, 4.2
Packing density (g./ml.): 0.41 to 0.44
Specific surface area (BET, m.$^2$/g.): 230 to 260
Compressive breaking strength (kg.): 3 to 10
The results are shown in Table 1.

COMPARATIVE EXAMPLE 1

The preparation of catalyst and the reaction were carried out in the same manner as in Examples 1 to 3 except that activated alumina (commercial name "ACBM-1") having an average diameter of 5.5 mm. was employed as a carrier.

The result is shown in Table 1.

It is observed that the removal effect of ethylene and vinyl chloride is low as compared with Examples 1 to 3.

TABLE 1

|  | Ex. 1 | Ex. 2 | Ex. 3 | Com. Ex. 1 |
|---|---|---|---|---|
| Particle size of catalyst (mm.) | 2.5 | 3.3 | 4.2 | 5.5 |
| Outer surface area per unit packed catalyst volume (cm.$^2$/ml.) | 14 | 11 | 8.4 | 6.2 |
| Concentration (p.p.m.) |  |  |  |  |
| $C_2H_4$ | ≦1 | 1 | 5 | 100 |
| VC | 4 | 6 | 11 | 27 |
| $Cl_2$ | 180 | 170 | 160 | 170 |
| HCl | 670 | 730 | 860 | 2800 |

EXAMPLE 4

The reaction was carried out continuously for 1,000 hours under the same conditions as in Example 1 except that ferric chloride supported on activated alumina (commercial name "ACBM-1") having an average diameter of 3.3 mm. in an amount of 9% by weight in terms of iron was employed as a catalyst, and the change in the activity of the catalyst was observed with the lapse of time.

The result is shown in Table 2.

COMPARATIVE EXAMPLE 2

The procedure of Example 4 was repeated except that the amount of ferric chloride support on the activated alumina was 2% by weight in terms of iron.

The result is shown in Table 2.

From the results shown in Table 2, it is observed that the catalyst in Example 4 has a stronger activity than that in Comparative Example 2 and moreover the lowering of the activity is very small.

TABLE 2

| | Concentration (p.p.m.) | | | | | |
| | Example 4 | | | Com. Ex. 2 | | |
| Reaction time (hour) | $C_2H_4$ | VC | $Cl_2$ | $C_2H_4$ | VC | $Cl_2$ |
|---|---|---|---|---|---|---|
| 2 | <1 | 3.1 | 210 | 60 | 21 | 190 |
| 5 | <1 | 4.8 | 200 | 104 | 29 | 220 |
| 100 | <1 | 4.3 | 220 | 118 | 32 | 210 |
| 200 | <1 | 5.0 | 200 | 170 | 41 | 200 |
| 500 | <1 | 4.7 | 230 | 310 | 50 | 210 |
| 1000 | <1 | 5.2 | 210 | 560 | 58 | 230 |

EXAMPLE 5

Activated alumina (commercial name "HSC-114" made by HOUDRY PROCESS AND CHEMICAL CO.) having a particle size of ¼ inch (about 6.4 mm.) was employed as a catalyst for the reactor 1. The first layer of the reactor 1 was packed with a mixture of 20% of the catalyst and a spherical fused alumina having a particle size of 6 to 7 mm. as a catalyst diluent, and the second layer was packed with a mixture of 40% of the catalyst and the diluent, and the third layer was packed with only the catalyst.

The gas having the same composition as in Examples 1 to 4 was fed to the reactor 1 together with an equimolar amount of chlorine with the total amounts of ethylene and vinyl chloride included in the gas, and the concentrations of ethylene and vinyl chloride in the effluent gas from the reactor 1 were measured. The effluent gas contained 0.57% of ethylene and 220 p.p.m. of vinyl chloride.

Chlorine was fed to the effluent gas from the reactor 1 in such an amount that the excess percent of chlorine is 15% by mole based on the total amount of ethylene and vinyl chloride, and the resulting mixed gas was introduced into the reactor 2 packed with the same catalyst as in Example 2. The effluent gas from the reactor 2 contained 2 p.p.m. of ethylene, 7 p.p.m. of vinyl chloride and 230 p.p.m. of $Cl_2$.

What we claim is:

1. A process for removing ethylene and vinyl chloride from a gas stream which comprises passing a mixed gas comprising ethylene, vinyl chloride and up to 15 mol% of excess chlorine, based on the total amount of ethylene and vinyl chloride, through a fixed bed reactor at a temperature of 80° to 200° C., at a space velocity of 100 to 5,000 hr$^{-1}$ and under a pressure of 1 to 20 atm.; said fixed bed reactor charged with a catalyst consisting essentially of an activated alumina supporting at least 4% by weight of ferric chloride in terms of iron, said catalyst having an outer surface area per unit packed catalyst volume of not less than 7.8 cm$^2$/ml., said mixed gas passing into the fixed bed reactor having a total concentration of ethylene and vinyl chloride of less than about 1% by volume and said mixed gas leaving the fixed bed reactor having an ethylene concentration of not more than 10 ppm and a vinyl chloride concentration of not more than 20 ppm.

2. The process of claim 1, wherein said catalyst has an equivalent diameter of not more than 4.5 mm.

3. The process of claim 1, wherein said mixed gas is a waste gas obtained after separating a condensate by cooling to liquefy a gas produced in oxychlorination of ethylene with hydrogen chloride and air.

4. The process of claim 1, wherein said chlorine is included in the mixed gas in an amount such that the concentration of the unreacted chlorine in the gas passed through the fixed-bed reactor is at most 500 p.p.m.

5. The process of claim 1, wherein said fixed-bed reactor is an adiabatic type reactor.

* * * * *